United States Patent
Koontz et al.

(10) Patent No.: US 12,135,970 B2
(45) Date of Patent: Nov. 5, 2024

(54) SYSTEM AND METHOD FOR SYNCHRONIZING PROCESSING BETWEEN A PLURALITY OF PROCESSORS

(71) Applicant: THE BOEING COMPANY, Arlington, VA (US)

(72) Inventors: Ronald J. Koontz, Mesa, AZ (US); Jason Ellis Sherrill, Mesa, AZ (US); Hyunsuk Shin, Los Angeles, CA (US); Sean M. Ramey, Stevens Lake, WA (US); Joshua R. Byrne, Seattle, WA (US); David C. Matthews, Duvall, WA (US)

(73) Assignee: THE BOEING COMPANY, Arlington, VA (US)

( * ) Notice: Subject to any disclaimer, the term of this patent is extended or adjusted under 35 U.S.C. 154(b) by 47 days.

(21) Appl. No.: 18/185,416

(22) Filed: Mar. 17, 2023

(65) Prior Publication Data
US 2024/0311158 A1    Sep. 19, 2024

(51) Int. Cl.
*G06F 9/38* (2018.01)
*G06F 9/30* (2018.01)

(52) U.S. Cl.
CPC .......... *G06F 9/3869* (2013.01); *G06F 9/3009* (2013.01)

(58) Field of Classification Search
None
See application file for complete search history.

(56) References Cited

U.S. PATENT DOCUMENTS

| | | | |
|---|---|---|---|
| 6,708,239 B1 | 3/2004 | Ellerbrock et al. | |
| 7,581,031 B2 | 8/2009 | Konz et al. | |
| 7,689,699 B2 | 3/2010 | Chazin | |
| 7,739,339 B2 | 6/2010 | Borys et al. | |
| 8,924,780 B2 | 12/2014 | Van Stensel | |

(Continued)

FOREIGN PATENT DOCUMENTS

| | | | |
|---|---|---|---|
| EP | 2175371 A1 | 4/2010 | |
| EP | 2592555 A2 | 5/2013 | |
| WO | WO 2007/006013 A2 | 1/2007 | |

OTHER PUBLICATIONS

Hetland, C. et al., Paths to Fast Barrier Synchronization on the Node, 2019, ACM, pp. 109-120. (Year: 2019).*

*Primary Examiner* — Eric Coleman
(74) *Attorney, Agent, or Firm* — ALSTON & BIRD LLP (57) ABSTRACT

A system, method and computer program product to synchronize processing across multiple lanes. In a system, a synchronizing interface network controller (SINC) communicates with a plurality of processors. Each processor executes an application having thread(s) of operation. Each processor notifies the SINC when a specific thread is ready to perform a respective operation. The SINC releases the processors to perform the respective operation upon being notified by all processors that the specific thread is ready to perform the respective operation. Each processor is configured to monitor for the release of the processors and to also determine whether sufficient time remains within a time window to perform the respective operation. If insufficient time remains, a processor notifies the SINC that the specific thread is no longer ready to perform the respective operation. If the processors are released by the SINC while sufficient time remains, each processor performs the respective operation.

20 Claims, 3 Drawing Sheets

(56) References Cited

U.S. PATENT DOCUMENTS

| | | | |
|---|---|---|---|
| 9,003,405 B1 | 4/2015 | Hotra | |
| 9,015,302 B2 | 4/2015 | Howe | |
| 9,438,411 B1 | 9/2016 | Lojeck et al. | |
| 9,760,094 B2 | 9/2017 | Saad et al. | |
| 9,811,455 B2 | 11/2017 | Ellerbrock et al. | |
| 10,528,077 B2 | 1/2020 | Lee et al. | |
| 10,599,513 B2 | 3/2020 | Lee et al. | |
| 11,132,268 B2 | 9/2021 | Wong et al. | |
| 2002/0152418 A1 | 10/2002 | Griffin et al. | |
| 2005/0060709 A1* | 3/2005 | Kanai | G06F 9/4887 718/100 |
| 2005/0086652 A1 | 4/2005 | Tian et al. | |
| 2007/0033511 A1 | 2/2007 | Davies | |
| 2007/0174687 A1 | 7/2007 | Graham et al. | |
| 2007/0271010 A1 | 11/2007 | Kossentini | |
| 2009/0044044 A1 | 2/2009 | Harter et al. | |
| 2009/0193229 A1 | 7/2009 | Aegerter et al. | |
| 2011/0066779 A1 | 3/2011 | Bogenberger et al. | |
| 2011/0093838 A1 | 4/2011 | Archambault et al. | |
| 2013/0125137 A1 | 5/2013 | Diekema et al. | |
| 2014/0281120 A1 | 9/2014 | Ellerbrock et al. | |
| 2016/0019066 A1* | 1/2016 | Diamos | G06F 9/3009 712/228 |
| 2018/0307985 A1* | 10/2018 | Appu | G06F 9/522 |
| 2018/0336157 A1 | 11/2018 | Graffy et al. | |
| 2019/0042307 A1* | 2/2019 | Sivakumar | G06F 9/5038 |
| 2019/0155325 A1 | 5/2019 | Lee et al. | |
| 2020/0319984 A1 | 10/2020 | Bryant et al. | |
| 2021/0124627 A1* | 4/2021 | Giroux | G06F 9/546 |
| 2021/0382717 A1* | 12/2021 | Jiang | G06F 9/3009 |
| 2022/0004864 A1* | 1/2022 | Dally | G06N 3/04 |
| 2022/0179720 A1 | 6/2022 | Byrne et al. | |
| 2022/0413899 A1* | 12/2022 | Ranganathan | G06F 9/485 |

\* cited by examiner

SYSTEM AND METHOD FOR SYNCHRONIZING PROCESSING BETWEEN A PLURALITY OF PROCESSORS

TECHNOLOGICAL FIELD

An example embodiment relates generally to a system, a method and a computer program product for synchronizing processing between a plurality of processors and, in one embodiment, for ensuring that multi-threaded synchronous processing is constrained to occur within the same time window by the plurality of processors.

BACKGROUND

For any of a wide variety of purposes, multiple processors may concurrently execute the same applications, each of which may include one or more execution threads or processes. For example, multiple processors may execute the same application to enhance fault tolerance and overall system safety. Alternatively, the results of the concurrent execution of an application by multiple processors may be considered for purposes of integrity monitoring or the like. Furthermore, the concurrent execution of the same application by multiple processors may also be utilized in an instance in which availability of the application is demanded.

The execution of the same applications and, in turn, the same processes, by multiple processors are advantageously synchronized to maintain computational lane coherency. As such, different instances of the same process utilize the same data even though the processes are executed by different processors. By maintaining lane coherence, inbound and outbound message processing associated with execution of the processes by the plurality of processors is also synchronized.

One approach to the synchronization of the inbound and outbound message processing associated with execution of the same process by multiple processors employs network switch loopback. However, this approach introduces significant data latency as well as a requirement for external hardware in the form of a network switch. Another approach for synchronizing inbound and outbound message processing during execution of the same process by multiple processors is reliance upon additional memory that is shared by the plurality of processors. The additional memory is generally sized to accommodate worst-case skew between the messages processed during the execution of the same process by the plurality of processors, thereby causing the additional memory to be larger than is desired. The additional memory also requires the addition of hardware and correspondingly increases the power requirements associated with execution of the same process by the plurality of processors. Furthermore, additional software is generally required to provide mutual access to the shared memory by the plurality of processors executing the same process, thereby increasing the complexity of the system.

BRIEF SUMMARY

A system, method and computer program product are provided for synchronizing processing across multiple lanes such that multi-threaded synchronous processing is constrained to occur within the same time windows. As such, lane coherency is maintained. By maintaining lane coherency, the system, method and computer program product of an example embodiment ensure that identical input message data is received by and processed by the same application instantiated on each of the plurality of processors. Further, the system, method and computer program product of an example embodiment require limited memory and limited or no external hardware to synchronize the processing of the plurality of processors.

In an example embodiment, a system is provided that is configured to synchronize processing. The system includes a synchronizing interface network controller (SINC) and a plurality of processors in communication with the SINC. Each processor is configured to execute one or more applications with a respective application comprising one or more threads of operation. Each processor is also configured to notify the SINC in an instance in which a specific thread of one or more threads of operation is ready to perform a respective operation. The SINC is configured to release the plurality of processors to perform the respective operation in response to the SINC being notified by all of the processors that are configured to execute the respective application that the specific thread is ready to perform the respective operation. Each of the plurality of processors is configured to monitor for the release of the processors by the SINC and to also determine whether sufficient time remains within a time window to perform the respective operation. In an instance in which insufficient time remains to perform the respective operation prior to being released by the SINC, each of the plurality of processors is configured to notify the SINC that the specific thread is no longer ready to perform the respective operation. In an instance in which the processors are released by the SINC while sufficient time remains to perform the respective operation, each of the plurality of processors is configured to perform the respective operation.

Each of the plurality of processors is further configured in an example embodiment to determine whether sufficient time remains to perform the respective operation prior to notifying the SINC that the specific thread of the one or more threads of operation is ready to perform the respective operation. In the instance in which a respective processor notifies the SINC that the specific thread is no longer ready to perform the respective operation, the respective processor is configured in accordance with an example embodiment to determine whether sufficient time remains in a subsequent time window to perform the respective operation prior to again notifying the SINC that the specific thread of the one or more threads of operation is ready to perform the respective operation. In this example embodiment, in an instance in which the respective processor is released by the SINC to perform the respective operation after the respective processor notifies the SINC that the specific thread is no longer ready to perform the respective operation but prior to the respective processor beginning to determine whether sufficient time remains in the subsequent time window to perform the respective operation, the respective processor is configured to perform the respective operation.

Each of the plurality of processors is configured in accordance with an example embodiment to determine whether sufficient time remains within the time window to perform the respective operation by comparing the time remaining within the time window to the time required to perform the respective operation. In this regard, the time remaining within the time window is defined by the difference between the duration of the time window and the time elapsed since the beginning of the time window. In an example embodiment, each of the plurality of processors being configured to perform the respective operation provides for synchronized processing of the respective operation.

In another embodiment, a method is provided for synchronizing processing. The method includes providing for communication between a plurality of processors and a synchronizing interface network controller (SINC) and executing one or more applications by each of the plurality of processors. A respective application includes one or more threads of operation. The method also includes providing for notification from each processor to the SINC in an instance in which a specific thread of the one or more threads of operation is ready to perform a respective operation and determining whether the SINC has issued a release to enable the plurality of processors to perform the respective operation in response to the SINC being notified by all of the processors that are configured to execute the respective application that the specific thread is ready to perform the respective operation. In response to failing to receive the release from the SINC, the method includes determining whether sufficient time remains within a time window to perform the respective operation. In an instance in which insufficient time remains to perform the respective operation prior to being released by the SINC, the method provides for notification from each of the plurality of processors to the SINC that a specific thread is no longer ready to perform the respective operation. In an instance in which the processors are released by the SINC while sufficient time remains to perform the respective operation, the method further includes causing each of the plurality of processors to perform the respective operation.

The method of an example embodiment also includes determining whether sufficient time remains to perform the respective operation prior to providing the notification to the SINC that a specific thread of the one or more threads of operation is ready to perform the respective operation. In the instance in which the notification is provided to the SINC that a specific thread is no longer ready to perform the respective operation, the method of an example embodiment determines whether sufficient time remains in a subsequent time window to perform the respective operation prior to again notifying the SINC that a specific thread of the one or more threads of operation is ready to perform the respective operation. In this embodiment, in an instance in which a respective processor is released by the SINC to perform the respective operation after the respective processor notifies the SINC that a specific thread is no longer ready to perform the respective operation but prior to the respective processor beginning to determine whether sufficient time remains in the subsequent time window to perform the respective operation, the method further includes causing the respective processor to perform the respective operation.

The method of an example embodiment determines whether sufficient time remains within the time window to perform the respective operation by comparing a time remaining within the time window to a time required to perform the respective operation. The time remaining within the time window is defined by a difference between a duration of the time window and a time elapsed since a beginning of the time window. In an example embodiment, the method causes each of the plurality of processors to perform the respective operation by providing for synchronized processing of the respective operation.

In a further example embodiment, a computer program product is provided that is configured to synchronize processing. The computer program product includes a non-transitory computer readable medium having program code stored thereon with the program code including program code instructions being configured, upon execution, to execute one or more applications by each of a plurality of processors. A respective application includes one or more threads of operation. Each of the plurality of processors is in communication with a synchronizing interface network controller (SINC). The program code also includes program code instructions configured, upon execution, to provide for notification from each processor to the SINC in an instance in which a specific thread of the one or more threads of operation is ready to perform a respective operation. The program code further includes program code instructions configured, upon execution, to determine whether the SINC has issued a release to enable the plurality of processors to perform the respective operation in response to the SINC being notified by all of the processors that are configured to execute the respective application that a specific thread is ready to perform the respective operation. The program code additionally includes program code instructions that are configured, upon execution and in response to receiving the release from the SINC, to determine whether sufficient time remains within a time window to perform the respective operation and, in an instance in which insufficient time remains to perform the respective operation prior to being released by the SINC, provide for notification from one or more of the plurality of processors to the SINC that a specific thread is no longer ready to perform the respective operation. The program code also includes program code instructions that are configured, upon execution and in an instance in which the processors are released by the SINC while sufficient time remains to perform the respective operation, to cause each of the plurality of processors to perform the respective operation.

The program code of an example embodiment also includes program code instructions configured, upon execution, to determine whether sufficient time remains to perform the respective operation prior to providing the notification to the SINC that a specific thread of the one or more threads of operation is ready to perform the respective operation. In the instance in which the notification is provided to the SINC that a specific thread is no longer ready to perform the respective operation, the program code of an example embodiment includes program code instructions configured, upon execution, to determine whether sufficient time remains in a subsequent time window to perform the respective operation prior to again notifying the SINC that a specific thread of the one or more threads of operation is ready to perform the respective operation. In an instance in which a respective processor is released by the SINC to perform the respective operation after the respective processor notifies the SINC that a specific thread is no longer ready to perform the respective operation but prior to the respective processor beginning to determine whether sufficient time remains in the subsequent time window to perform the respective operation, the program code of an example embodiment includes program code instructions configured, upon execution, to cause the respective processor to perform the respective operation.

The program code instructions of an example embodiment are configured to determine whether sufficient time remains within the time window to perform the respective operation comprise program code instructions configured to compare a time remaining within the time window to a time required to perform the respective operation. The time remaining within the time window is defined by the difference between the duration of the time window and the time elapsed since the beginning of the time window. In an example embodiment, the program code instructions are configured to cause each of the plurality of processors to perform the respective operation and include program code instructions configured to provide for synchronized processing of the respective operation.

BRIEF DESCRIPTION OF THE DRAWINGS

Having described certain examples of the present disclosure in general terms above, reference will now be made to the accompanying drawings, which are not necessarily drawn to scale and wherein.

DETAILED DESCRIPTION

Some examples of the present disclosure will now be described more fully hereinafter with reference to the accompanying drawings, in which some, but not all examples of the present disclosure are shown. Indeed, these examples may be embodied in many different forms and should not be construed as limited to the examples set forth herein; rather, these examples are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with examples of the present disclosure. Thus, use of any such terms should not be taken to limit the spirit and scope of examples of the present disclosure.

A system, method and computer program product are provided for synchronizing processing operations performed by each of a plurality of processors. By synchronizing the processing, the system, method and computer program product provide for each of the plurality of processors to concurrently perform the same threads of operation in the same time windows. As a result, the system, method and computer program product of an example embodiment provide for integrity monitoring as well as improved availability and fault tolerance as a result of the redundancy. In this regard, certain applications, such as time partitioned real-time embedded avionic systems, may require that user partitioned software, that is, application software, be configured to execute in identical time windows on parallel lanes. By performing operations within the same time windows across parallel lanes that are implemented by the plurality of processors, the system, method and computer program product of an example embodiment ensure that the same inbound messages are received in order to provide for the processing and the subsequent transmission of identical outbound messages in addition to synchronizing file input/output operations across parallel lanes.

Figure 1:
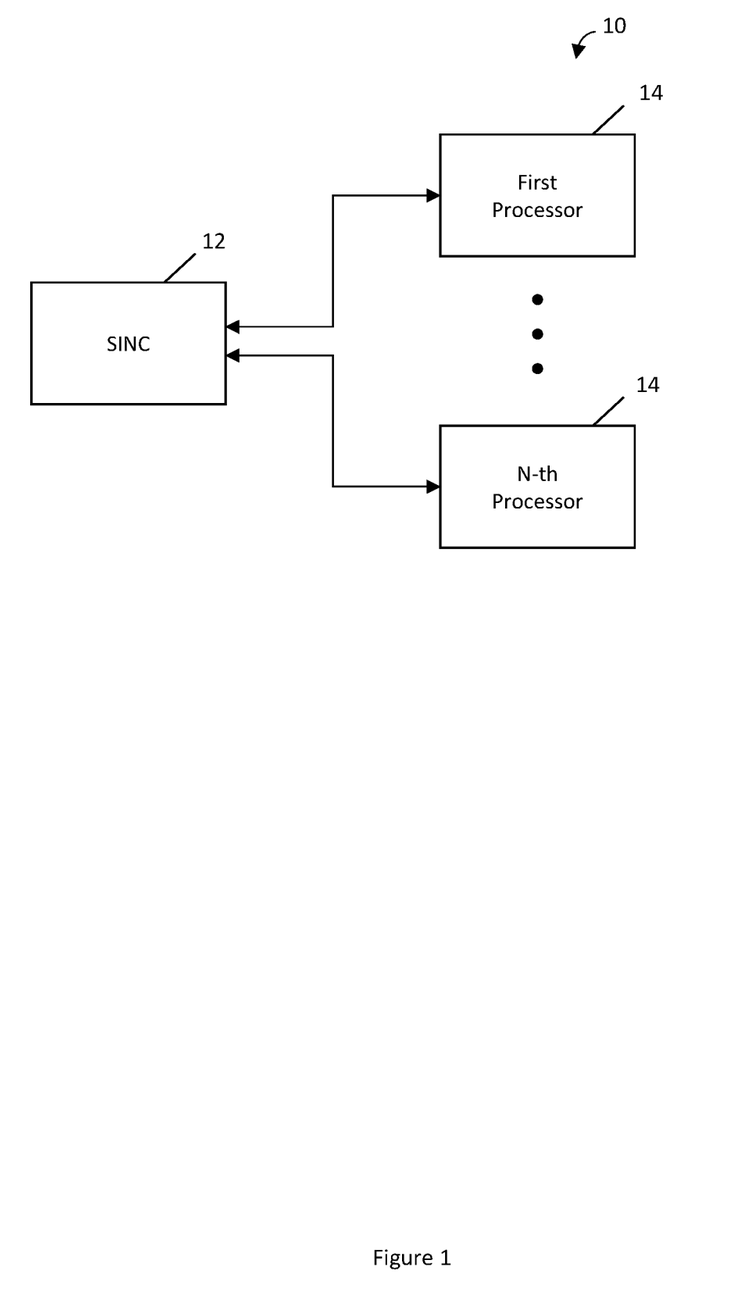
FIG. 1 is a representation of a system that may be configured in accordance with an example embodiment of the present disclosure in order to synchronize processing.

Referring now to FIG. 1, a system 10 in accordance with an example embodiment for synchronizing processing across multiple computing lanes that are provided by a plurality of processors is depicted. As shown, the system includes a SINC 12 in communication with a plurality of processors 14. The SINC 12 may be embodied by a variety of devices including, for example, as an application-specific integrated circuit (ASIC) or a field programmable gate array (FPGA). Although two processors designated the first processor and the N-th processor are depicted, the system 10 of other example embodiments may include any number of processors in communication with the SINC 12.

The plurality of processors 14 of an example embodiment are configured to operate synchronously and, as such, may be clocked by the same clock source. In other examples, however, the plurality of processors 14 are configured to operate asynchronously, such as by being clocked by different clock sources. The plurality of processors 14 may include a plurality of the same type of processors. Alternatively, the plurality of processors 14 may be embodied by a plurality of different types of processors, that is, the processors may be dissimilar processors (having different internal hardware architectures). In one example, the plurality of processors 14 include a plurality of multi-core processors. The processors 14 are each configured to execute one or more applications, at least some of which are to be synchronized. At least some of the applications may include multiple threads of operations, e.g., one or more processes. In an example, two or more threads of an application may execute concurrently, even though the threads may run at different periodic rates or even aperiodically. In an instance in which the system 10 includes a plurality of multi-core processors, each application may be executed in a partition on a particular core or set of cores of a respective processor. As a result, the same application and, in turn, the same thread may be executed by a respective core of two or more of the multi-core processors of this example.

Figure 2:
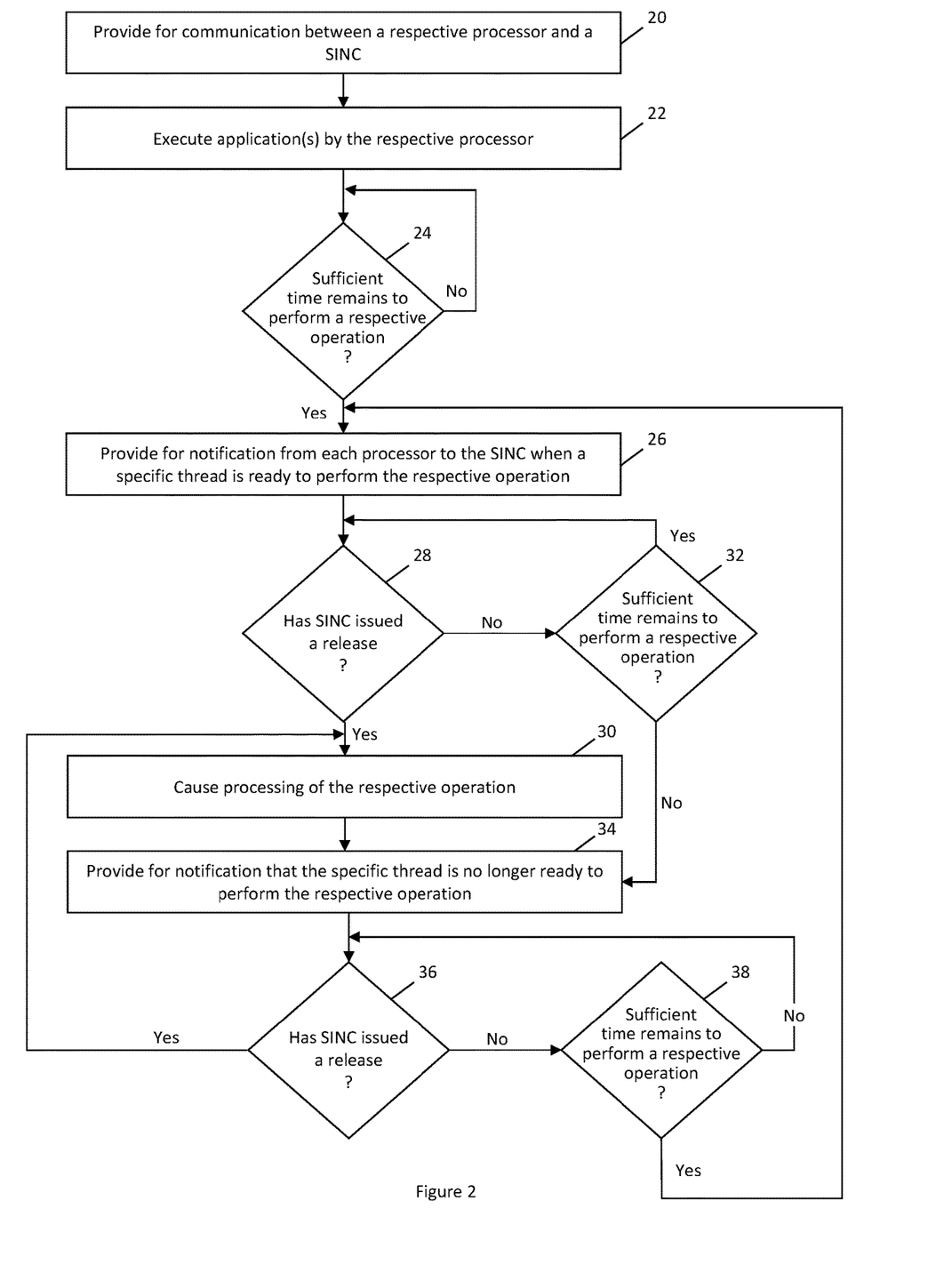
FIG. 2 is a flow chart illustrating the operations performed, such as by the system of FIG. 1, in order to synchronize processing of a plurality of processors in accordance with an example embodiment of the present disclosure.

Referring now to FIG. 2, the operation performed by the system 10, such as depicted in FIG. 1, in accordance with an example embodiment of the present disclosure are illustrated. As shown in block 20 of FIG. 2, the system 10 is configured to provide for communication between the plurality of processors 14 and the SINC 12. Additionally, each of the plurality of processors 14 is configured to execute one or more applications as shown in block 22. In this regard, a respective application includes one or more threads of operation, herein after also generally referenced as threads. In some example embodiments, such as in conjunction with systems compliant with the ARINC 653 standard, a thread of operation may also be referenced as a process. As such, reference herein to threads of operation, threads or processes may be used interchangeably. Additionally, reference to the operations performed by a processor 14 in relation to FIG. 2 and FIG. 3 applies equally to each of the plurality of processors with each processor performing the same operations as shown in the flowcharts.

In order to synchronize processing of the same thread of operation across the plurality of processors 14, each processor is initially configured to determine whether sufficient time remains in a time window, such as the current time window, to perform the respective operation. See block 24 of FIG. 2. In this regard, the time scale may be divided into a series of time windows. Although the time windows may have different lengths, the time windows are typically equally sized.

In an instance in which a processor 14 determines that there is insufficient time remaining within the time window to perform the respective operation, the processor repeatedly monitors the time remaining within the time window, such as the current time window, relative to the time required to perform a respective operation to identify an instance in which there is sufficient time remaining in the time window to perform the respective operation. Typically, the processor 14 in this situation will determine that sufficient time remains to perform the respective operation once time has passed and there has been a transition to the next or subsequent time window, which, in turn, has sufficient time to perform the respective operation, particularly in an instance in which the determination by the processor 14 as to whether sufficient time remains occurs relatively early within the time window.

The time required to perform a respective operation may be defined in various manners. For example, the time required to perform a respective operation may be predefined and known by the processor 14 or stored by a memory device associated with or otherwise accessible by the processor. While a time window may be longer temporally than the time required to perform a respective operation, the determination as to whether sufficient time remains within the time window to perform a respective operation is dependent not upon the size of the time window itself and the time required to perform the respective operation, but also the time remaining within the time window, that is, the time remaining between the current time and the end of the time window.

In an instance in which the processor 14 determines that sufficient time remains within a time window, such as the current time window, to perform a respective operation, the processor is configured to provide for notification to the SINC 12 that the specific thread of operation is ready to perform the respective operation in the time window. See block 26. In order to provide for synchronized processing of the threads of operation in the same time windows by each of a plurality of processors 14, the SINC 12 requires that a notification is received from each of the plurality of processors that the respective operation is ready to be performed. Once the SINC 12 has received a notification from each of the plurality processors 14, the SINC is configured to issue a release. However, in an instance in which the SINC 12 has not received a notification from one or more of the plurality of processors 14, such as in an instance in which the SINC has not received notification from any of the processors or in an instance in which the SINC has received notification from some, but not all of the processors, the SINC will not issue a release since not all of the processors have indicated the availability to perform the respective operation.

As such, the processor 14 is configured to monitor the communication provided by the SINC 12 to determine whether the SINC 12 has issued a release. See block 28 of FIG. 2. In an instance in which the SINC 12 has issued a release, the processor 14 is configured to cause processing of the specific thread within the time window, e.g., the current time window, in order to perform the respective operation. See block 30. In this regard, each of the plurality of processors 14 are configured to identify the release provided by the SINC 12 and then synchronously cause processing of the respective operation, thereby synchronizing processing of the same thread within the same time window by each of the plurality of processors.

In an instance in which the SINC 12 has not issued a release, the processors 14 are configured to determine whether sufficient time remains in the time window, such as within the current time window, to perform the respective operation. See block 32. In an instance in which sufficient time does remain, the processor 14 is configured to continue to monitor for a release from the SINC 12 as shown in block 28 until such time that the SINC 12 has issued the release and the respective operation is performed in parallel by each of the plurality of processors or until the processor determines that there is no longer sufficient time within the time window, such as the current time window, to perform the respective operation.

In an instance in which the SINC 12 has not issued a release and the processor 14 has determined that there is no longer sufficient time remaining in the time window, such as within the current time window, to perform the respective operation, the processor is configured to provide for notification to the SINC 12 that the specific thread is no longer ready to perform the respective operation. See block 34. Although the processor 14 has provided for the notification that the specific thread is no longer ready to perform the respective operation, the processor is also configured as shown in block 36 to determine whether the SINC 12 has issued a release. A release will be issued in this instance when the SINC 12 receives notification from each of the plurality of processors 14 that the specific thread was ready to perform the respective operation and, in turn, issued the release prior to receiving and/or acting upon the notification provided by the processor that the specific thread is no longer ready to perform the respective operation. For example, the SINC 12 may have received notification from all of the processors 14 that the specific thread is ready to perform the respective operation and then issued the release concurrent with or slightly prior to having received notification from one or more processors that the specific thread is no longer ready to perform the respective operation. In this instance in which the SINC 12 has not yet acted upon the notification that the specific thread is no longer ready to perform the respective operation, the processor 14 is configured to cause processing of the respective operation as is shown in block 30, thereby resolving a potential race condition between the plurality of processors in which a leading processor, e.g., leading lane, issued a notification to the SINC 12 (or the readiness to perform a respective operation), but then removed or is in the process of removing the notification by the time at which a lagging processor, e.g., lagging lane, issues its notification to the SINC 12.

In determining whether sufficient time remains within a window of time to perform an operation, a processor 14 of an example considers the time at which the window will complete and a temporal execution offset between the plurality of processors that may have a predefined value that equals or exceeds the worst case skew accumulation between the plurality of processors. Thus, the processor 14 may determine whether sufficient time remains within a time window based not upon the actual time at which the window will complete, but based upon a time that is prior to the actual time that the time window will complete by an amount equal to the temporal offset. As a result of the temporal offset, even though the processor 12 may have determined that the time window no longer has sufficient time remaining to perform the operation and notified the SINC 12 as shown in the blocks 32 and 34, the time window may actually have sufficient time to perform the operation as shown in block 30 in an instance in which the SINC 12 issues a release as shown in block 36 prior to receiving or acting upon the notification from the processor that the specific thread is no longer ready to perform the respective operation.

In an instance in which a processor 14 has provided notification that the specific thread is no longer ready to perform the respective operation, such as in an instance in which insufficient time has been determined to remain within the current time window to perform the respective operation and in which the SINC 12 has not issued a release prior to acting upon the notification, the SINC 12 is configured to again wait for subsequent notifications from all of the plurality of processors that the specific thread is ready to perform the respective operation, such as after transition to the next or subsequent time window, which provides sufficient time to perform the respective operation. As such, in an instance in which the SINC 12 has not issued a release, the processor 14 is configured to again determine whether sufficient time remains in the time window to perform the respective operation. See block 38. As the processor 14 has previously determined that there was insufficient time to perform the respective operation in a first time window, the processor will not generally determine that sufficient time remains to perform the respective operation until the system transitions to the next time window which should have sufficient time to perform the respective operation. In an instance in which the processor 14 does determine that sufficient time remains in the time window to perform the respective operation, such as following transition to the subsequent time window, the processor again provides for notification to the SINC 12 that the specific thread is ready to perform the respective operation as shown in block 26. As described above, the SINC 12, in turn, monitors for notification from each of the plurality of processors prior to releasing the processors to cause concurrent processing of the respective operation.

The process described above and depicted in FIG. 2 is performed concurrently by each of the plurality of processors 14. As such, the interaction between the SINC 12 and the plurality of processors 14 ensures that the threads of operation are performed synchronously in the same time windows by each of the plurality of processors by ensuring that the processing of a thread of operation does not commence until each of the plurality of processors have sufficient time within the current time window to perform the operation.

Figure 3:
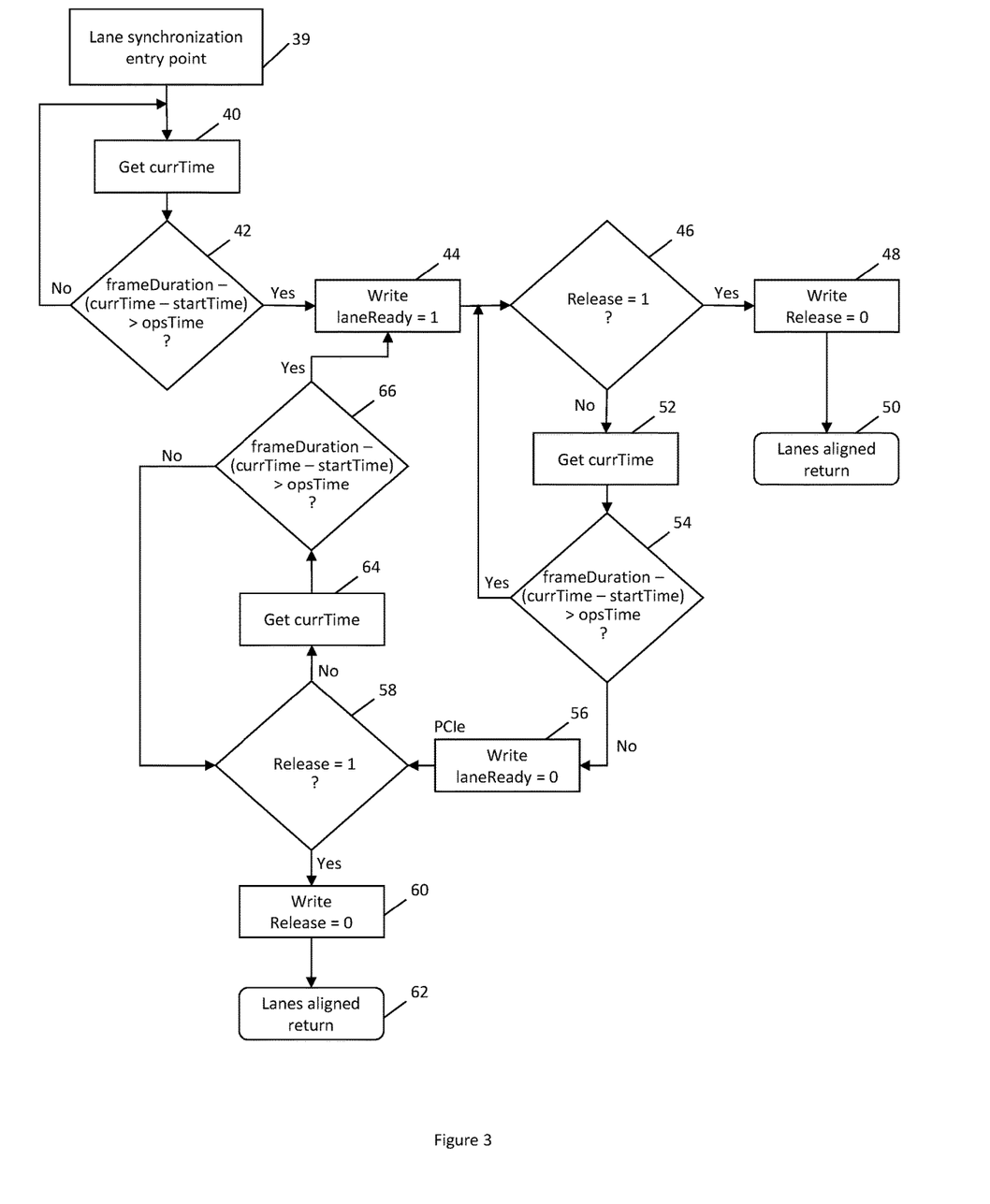
FIG. 3 is another flow chart illustrating the operations performed, such as by the system of FIG. 1, in order to synchronize processing of a plurality of processors in accordance with another example embodiment of the present disclosure.

By way of further example, FIG. 3 depicts an example of the process of FIG. 2 as performed by one of the plurality of processors 14 in communication with the SINC 12. As with FIG. 2, the process depicted by FIG. 3 will be performed by each of the plurality of processors 14 such that the SINC 12 can ensure that processing is synchronized across the plurality of processors such that the same threads of operation are performed in the same time windows by each of the plurality of processors.

As shown in FIG. 3, beginning at the lane synchronization entry point block 39, a processor 14 is configured to determine whether sufficient time remains within the current time window to perform a respective operation prior to providing notification to the SINC 12. In this regard, the processor 14 is configured to obtain the current time currTime as shown in block 40. The processor 14 is then configured to determine the remaining time within the current time window by determining the difference between the size of the time window frameDuration and the time that has already elapsed within the time window, that is, currTime minus startTime wherein startTime is the time at which the time window commenced. As described above, the frameDuration may be defined in one example embodiment by the size or length of the time window as reduced by the temporal offset that accounts for worst-case skew accumulation between the plurality of processors 14. The processor 14 then compares the remaining time within the time window to the time required to perform the operation, that is, opsTime. In this regard, the time required to perform a respective operation may be known by the processor 14 or stored by a memory device or within another database accessible by the processor. See block 42. In an instance in which there is insufficient time remaining within the current time window to perform the respective operation, the processor continues to monitor whether sufficient time remains within the current time window to perform the respective operation, which typically will not occur until after transition to a subsequent time window for which the time remaining within the time window will likely be greater than that required to perform the respective operation.

Once the processor 14 determines that there is sufficient time in the current time window to perform the respective operation, the processor provides for notification to the SINC 12, such as by writing a predefined value, such as a value of 1, to a laneReady field of a memory device accessible by both the processor and the SINC 12, e.g., via a dual accessible shared memory. See block 44. The processor 14 then determines whether the SINC 12 has issued a release as shown in block 46 and as described above. In an example embodiment, the SINC 12 issues the release by writing a predefined value, e.g., 1, in a Release field of a memory device, e.g., random access memory, synchronous dynamic random access memory or the like, accessible by both the processor 14 and the SINC 12. In conjunction with FIG. 2, the SINC 12 is configured to issue the release once each of the plurality of processors 14 has provided notification that sufficient time remains within the current time window to perform the respective operation, such as evidenced by each of the plurality of processors writing a predefined value, e.g., 1, to a laneReady field. In an instance in which the SINC 12 has issued a release such that the plurality of parallel processing lanes are aligned, the processor 14 writes a predefined value, such as 0, to the Release field and commences processing of the respective operation. See blocks 48 and 50. However, in an instance in which the SINC 12 has not issued a release, the processor 14 is configured to again determine whether sufficient time remains within the current time window to perform the respective operation as shown in blocks 52 and 54 and as described above in conjunction with blocks 40 and 42, respectively. This process repeats until either the SINC 12 issues a release or until the processor 14 determines that insufficient time remains within the current window to perform the respective operation, in which case the processor is configured to provide notification to the SINC that insufficient time remains within the current time window to perform the respective operation, such as by writing a predefined value, e.g., 0, to the laneReady field as shown in block 56.

As described above in conjunction with block 36 of FIG. 2, the processor 14 is configured to determine whether the SINC 12 issued a release prior to having acted upon the notification that insufficient time remains to perform the respective operation within the current time window, that is, prior to acting upon the writing of a predefined value, e.g., 0, in a laneReady field. See block 58. In an instance in which the processor 14 determines that the SINC 12 has provided a release indicating that the parallel processing lanes provided by the plurality of processors are aligned, the processor writes a predefined value, e.g., 0, into the Release field and commences processing of the respective operation in parallel with the processing of the same operation in the same time window by each of the other processors. See blocks 60 and 62. However, in an instance in which the SINC 12 is determined at block 58 to not have issued a release, the processor 14 is configured to determine whether sufficient time remains within the current time window to perform the respective operation, such as after transition to the next or subsequent time window, as shown in blocks 64 and 66 and as described above in conjunction with blocks 40 and 42, respectively.

In an instance in which the processor 14 determines that sufficient time does remain within the current time window to perform the respective operation, the processor provides notification to the SINC 12, such as by writing a predefined value, e.g., 1, to the laneReady field and then waits for release by the SINC, such as following notification from each of the plurality processors, prior to performing the respective operation in the current time window. See blocks 44 and 46. However, if the processor 14 continues to determine that insufficient time remains within the current time window to perform the respective operation, the processor continues to monitor the timing as shown in blocks 64 and 66 to identify, such as following transition to the subsequent time window, that sufficient time remains within the current time window to perform the respective operation.

As described above, a system, method and computer program product are provided for synchronizing processing across multiple lanes such that multi-threaded synchronous processing is constrained to occur within the same time windows. As such, lane coherency is maintained. By maintaining lane coherency, the system, method and computer program product of an example embodiment ensure that identical input message data is received by and processed by each of the plurality of processors, thereby allowing for integrity monitoring of the processing. Additionally, the concurrent execution of the same application by multiple processors also provides for enhanced fault tolerance and also increases the availability of the function or system.

FIGS. 2 and 3 illustrate flowcharts describing the operation of systems, methods, and computer program products according to the disclosure. It is understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowchart, and combinations of blocks in the flowchart, can be implemented by special purpose hardware-based computer systems which perform the specified functions, or combinations of special purpose hardware and software instructions.

In some examples, some of the operations above may be modified or further amplified. Furthermore, in some examples, additional optional operations may be included. Modifications, amplifications, or additions to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

What is claimed is:

1. A system configured to synchronize processing, the system comprising:
a synchronizing interface network controller (SINC); and
a plurality of processors in communication with the SINC, wherein each processor is configured to execute one or more applications with a respective application comprising one or more threads of operation, wherein each processor is also configured to notify the SINC in an instance in which a specific thread of one or more threads of operation is ready to perform a respective operation,
wherein the SINC is configured to release the plurality of processors to perform the respective operation in response to the SINC being notified by all of the processors that are configured to execute the respective application that the specific thread is ready to perform the respective operation,
wherein each of the plurality of processors is configured to monitor for the release of the processors by the SINC and to also determine whether sufficient time remains within a time window to perform the respective operation,
wherein, in an instance in which insufficient time remains to perform the respective operation prior to being released by the SINC, each of the plurality of processors is configured to notify the SINC that the specific thread is no longer ready to perform the respective operation, and
wherein, in an instance in which the processors are released by the SINC while sufficient time remains to perform the respective operation, each of the plurality of processors is configured to perform the respective operation.

2. A system according to claim 1, wherein each of the plurality of processors is further configured to determine whether sufficient time remains to perform the respective operation prior to notifying the SINC that the specific thread of the one or more threads of operation is ready to perform the respective operation.

3. A system according to claim 1, wherein, in the instance in which a respective processor notifies the SINC that the specific thread is no longer ready to perform the respective operation, the respective processor is configured to determine whether sufficient time remains in a subsequent time window to perform the respective operation prior to again notifying the SINC that the specific thread of the one or more threads of operation is ready to perform the respective operation.

4. A system according to claim 3, wherein, in an instance in which the respective processor is released by the SINC to perform the respective operation after the respective processor notifies the SINC that the specific thread is no longer ready to perform the respective operation but prior to the respective processor beginning to determine whether sufficient time remains in the subsequent time window to perform the respective operation, the respective processor is configured to perform the respective operation.

5. A system according to claim 1, wherein each of the plurality of processors is configured to determine whether sufficient time remains within the time window to perform the respective operation by comparing a time remaining within the time window to a time required to perform the respective operation.

6. A system according to claim 5, wherein the time remaining within the time window is defined by a difference between a duration of the time window and a time elapsed since a beginning of the time window.

7. A system according to claim 1 wherein each of the plurality of processors being configured to perform the respective operation provides for synchronized processing of the respective operation.

8. A method for synchronizing processing, the method comprising:
   providing for communication between a plurality of processors and a synchronizing interface network controller (SINC);
   executing one or more applications by each of the plurality of processors, wherein a respective application comprises one or more threads of operation;
   providing for notification from each processor to the SINC in an instance in which a specific thread of the one or more threads of operation is ready to perform a respective operation;
   determining whether the SINC has issued a release to enable the plurality of processors to perform the respective operation in response to the SINC being notified by all of the processors that are configured to execute the respective application that the specific thread is ready to perform the respective operation;
   in response to failing to receive the release from the SINC, determining whether sufficient time remains within a time window to perform the respective operation and, in an instance in which insufficient time remains to perform the respective operation prior to being released by the SINC, providing for notification from any one or more of the plurality of processors to the SINC that the specific thread is no longer ready to perform the respective operation, and
   in an instance in which the processors are released by the SINC while sufficient time remains to perform the respective operation, causing each of the plurality of processors to perform the respective operation.

9. A method according to claim 8, further comprising determining whether sufficient time remains to perform the respective operation prior to providing the notification to the SINC that the specific thread of the one or more threads of operation is ready to perform the respective operation.

10. A method according to claim 8, wherein, in the instance in which the notification is provided to the SINC that the specific thread is no longer ready to perform the respective operation, the method further comprises determining whether sufficient time remains in a subsequent time window to perform the respective operation prior to again notifying the SINC that the specific thread of the one or more threads of operation is ready to perform the respective operation.

11. A method according to claim 10, wherein, in an instance in which a respective processor is released by the SINC to perform the respective operation after the respective processor notifies the SINC that the specific thread is no longer ready to perform the respective operation but prior to the respective processor beginning to determine whether sufficient time remains in the subsequent time window to perform the respective operation, the method further comprises causing the respective processor to perform the respective operation.

12. A method according to claim 8, wherein determining whether sufficient time remains within the time window to perform the respective operation comprises comparing a time remaining within the time window to a time required to perform the respective operation.

13. A method according to claim 12, wherein the time remaining within the time window is defined by a difference between a duration of the time window and a time elapsed since a beginning of the time window.

14. A method according to claim 8 wherein causing each of the plurality of processors to perform the respective operation comprises providing for synchronized processing of the respective operation.

15. A computer program product configured to synchronize processing, the computer program product comprising a non-transitory computer readable medium having program code stored thereon, the program code comprising program code instructions configured, upon execution, to:
   execute one or more applications by each of a plurality of processors, wherein a respective application comprises one or more threads of operation, and wherein each of the plurality of processors is in communication with a synchronizing interface network controller (SINC);
   provide for notification from each processor to the SINC in an instance in which a specific thread of the one or more threads of operation is ready to perform a respective operation;
   determine whether the SINC has issued a release to enable the plurality of processors to perform the respective operation in response to the SINC being notified by all of the processors that are configured to execute the respective application that the specific thread is ready to perform the respective operation;
   in response to receiving the release from the SINC, determine whether sufficient time remains within a time window to perform the respective operation and, in an instance in which insufficient time remains to perform the respective operation prior to being released by the SINC, provide for notification from one or more of the plurality of processors to the SINC that the specific thread is no longer ready to perform the respective operation, and
   in an instance in which the processors are released by the SINC while sufficient time remains to perform the respective operation, cause each of the plurality of processors to perform the respective operation.

16. A computer program product according to claim 15, wherein the program code further comprises program code instructions configured, upon execution, to determine whether sufficient time remains to perform the respective operation prior to providing the notification to the SINC that the specific thread of the one or more threads of operation is ready to perform the respective operation.

17. A computer program product according to claim 15, wherein, in the instance in which the notification is provided to the SINC that the specific thread is no longer ready to perform the respective operation, the program code further comprises program code instructions configured, upon execution, to determine whether sufficient time remains in a subsequent time window to perform the respective operation prior to again notifying the SINC that the specific thread of the one or more threads of operation is ready to perform the respective operation.

18. A computer program product according to claim 17, wherein, in an instance in which a respective processor is released by the SINC to perform the respective operation after the respective processor notifies the SINC that the specific thread is no longer ready to perform the respective operation but prior to the respective processor beginning to determine whether sufficient time remains in the subsequent time window to perform the respective operation, the program code further comprises program code instructions configured, upon execution, to cause the respective processor to perform the respective operation.

19. A computer program product according to claim 15, wherein the program code instructions configured to determine whether sufficient time remains within the time window to perform the respective operation comprise program code instructions configured to compare a time remaining within the time window to a time required to perform the respective operation.

20. A computer program product according to claim 19, wherein the time remaining within the time window is defined by a difference between a duration of the time window and a time elapsed since a beginning of the time window.

* * * * *